(12) United States Patent
Moulichon et al.

(10) Patent No.: US 12,609,642 B2
(45) Date of Patent: Apr. 21, 2026

(54) ADJUSTMENT OF PARAMETER VALUES OF A CONTROL RULE OF A GENERATOR

(71) Applicants:Schneider Electric Industries SAS, Rueil-Malmaison (FR); Institute Polytechnique de Grenoble, Grenoble (FR)

(72) Inventors: Audrey Moulichon, Grenoble (FR); Mazen Alamir, Saint Martin d'Heres (FR); Lauric Garbuio, Saint Martin le Vinoux (FR); Mustapha Amine Rahmani, Saint Martin d'Heres (FR); David Gualino, Saint Ismier (FR); Vincent Debusschere, Grenoble (FR); Nouredine Hadj-Said, Grenoble (FR); Miao-Xin Wang, Montbonnot Saint Martin (FR)

(73) Assignees: Schneider Electric Industries SAS, Rueil-Malmaison (FR); Institute Polytechnique de Grenoble, Grenoble (FR)

(*) Notice: Subject to any disclaimer, the term of this patent is extended or adjusted under 35 U.S.C. 154(b) by 0 days.

(21) Appl. No.: 17/032,258

(22) Filed: Sep. 25, 2020

(65) Prior Publication Data

US 2021/0104964 A1 Apr. 8, 2021

(30) Foreign Application Priority Data

Oct. 2, 2019 (FR) ...................................... 1910910

(51) Int. Cl.
H02P 9/00 (2006.01)
H02P 9/02 (2006.01)

(52) U.S. Cl.
CPC ............ *H02P 9/02* (2013.01); *H02J 2300/24* (2020.01)

(58) Field of Classification Search
CPC ... H02P 9/02; H02P 9/105; H02J 3/381; H02J 2300/28; H02J 2300/24; H02J 2310/10;
(Continued)

(56) References Cited

U.S. PATENT DOCUMENTS 9,184,626 B2 * 11/2015 Ebata ...................... H02J 3/466
2015/0008743 A1 * 1/2015 Kimura .................... H02J 3/38
307/52

(Continued)

FOREIGN PATENT DOCUMENTS

CN 106533289 A * 3/2017
CN 108376998 A * 8/2018 ............... H02J 3/24
(Continued)

OTHER PUBLICATIONS

CN 108376998 English machine translation.*
(Continued)

*Primary Examiner* — Julio C. Gonzalez
(74) *Attorney, Agent, or Firm* — Wolf, Greenfield & Sacks, P.C.

(57) ABSTRACT

Method for controlling a generator comprising an inverter and an electrical energy source, the generator being configured to deliver output electrical values to an electrical distribution grid, the inverter being controlled by a control law, the control law comprising a set of fixed values of parameters for modelling the functioning of a synchronous virtual generator so that the control law is configured to determine at least one target output value that must be delivered by the generator to the electrical distribution grid.

20 Claims, 5 Drawing Sheets

(58) Field of Classification Search
CPC ...... H02J 2300/20; H02J 3/40; H02J 3/00125;
H02J 3/00; H02J 3/46; H02J 2203/20;
H02J 2300/22; Y02E 10/56
See application file for complete search history.

(56) References Cited

U.S. PATENT DOCUMENTS

| | | | | |
|---|---|---|---|---|
| 2016/0204611 A1* | 7/2016 | Chambon | ............. | H02J 3/1835 |
| | | | | 307/26 |
| 2017/0235322 A1* | 8/2017 | Rahmani | ................ | H02J 3/381 |
| | | | | 700/295 |
| 2019/0334352 A1* | 10/2019 | Sugimoto | ................ | H02J 3/38 |
| 2020/0091728 A1* | 3/2020 | Cassoli | ................... | H02J 3/386 |
| 2021/0194383 A1* | 6/2021 | Tsuruma | ................... | H02J 3/38 |

FOREIGN PATENT DOCUMENTS

| | | | |
|---|---|---|---|
| CN | 109873446 A | 6/2019 |
| FR | 3086117 A1 | 3/2020 |
| WO | 2012116559 A1 | 9/2012 |

OTHER PUBLICATIONS

Pimprikar, T. et al., "Virtual Synchronous Generator—A new Trend in Technology for Smart Grid Integration", 2018 International Conference on Information, Communication, Engineering and Technology (ICICET), Aug. 29, 2018 (Aug. 29, 2018), IEEE, pp. 1-5, XP033446635.

Sakimoto, K. et al., "Stabilization of a power system with a distributed generator by a virtual synchronous generator function", 8th International Conference on Power Electronics—ECCE Asia, May 30, 2011 (May 30, 2011), IEEE, pp. 1498-1505, XP031956088.

Rahmani, M.A. et al., "Virtual Synchronous Generators for microgrid stabilization: Modeling, implementation and experimental validation on a microgrid laboratory", IEEE 2017 Asian Conference on Energy, Power and Transportation Electrification, 8 pages.

National Institute of Industrial Property (France) Search Report for Application No. 1910910 dated May 26, 2020, 1 page.

* cited by examiner

ADJUSTMENT OF PARAMETER VALUES OF A CONTROL RULE OF A GENERATOR

CROSS-REFERENCE TO RELATED APPLICATIONS

This application claims the benefit under 35 U.S.C. § 119(d) of French Patent Application No. 1910910, filed on Oct. 2, 2019, which is hereby incorporated herein by reference in its entirety.

TECHNICAL FIELD

The present invention relates to a method for controlling a generator.

The invention also relates to a generator using such a method.

PRIOR ART

A microgrid is generally a local electricity grid intended to produce and distribute electrical energy in zones that are generally isolated and distant from major electrical energy production centres.

Such isolated regions are for example islands, mountainous regions, or desert regions.

The principle of a microgrid also applies when a building, a set of buildings, or any other entity connected to a large distribution grid wishes to at least partly manage its energy production itself.

The main advantage of microgrids is thus that they function autonomously and are situated in proximity to consumption zones (also referred to as "loads"). Thus the losses inherent in long-distance distribution grids are limited.

The energy capacity of the microgrid is generally assured by one or more electrical energy sources of various types, including renewable energy sources, such as photovoltaic or wind energy sources.

In order to supply the electrical energy to the microgrid, a generator comprises at least the electrical energy source and an inverter.

The electrical source produces electrical power by generating D.C. voltage and current. The D.C. voltage and current are next converted by the inverter into an alternating voltage and current.

The inverter may be controlled in accordance with a static control law so as to emulate the behaviour of a generator. A virtual generator is then spoken of. It is thus possible to electrically connect virtual generators in parallel with other generators on the microgrid.

Such a virtual generator may nevertheless, under certain conditions, be confronted with instabilities, in particular in the event of short-circuit or low current circulating on the microgrid.

In particular, such short-circuits may occur when several events impact the microgrid, for example when a maintenance exercise gives rise to an unexpected rupture of a cable on the microgrid.

The control law may then not suffice to effectively control the electrical values at the output of the generator.

In order to overcome this problem, the documents WO 2012/116559 A1 and "Virtual synchronous generators for microgrid stabilization: Modeling, implementation and experimental validation on a microgrid laboratory", Rahmani and al., IEEE 2017 Asian Conference on Energy, Power and Transportation Electrification, provide for example for impedances, referred to as virtual impedances, in order to guarantee better stability of the inverter.

According to another example, the document FR 1858434 provides for the control law to comprise integration and correction loops in order to adjust the electrical values at the output of the inverter.

However, although they can prove to be generally satisfactory, such methods may prove to be insufficient, in particular when the instabilities on the grid prove to be of particularly short duration and/or of excessively high amplitude.

Thus the overvoltage or overcurrent resulting therefrom are liable to degrade the generator, and particularly the inverter.

When the instability occurs, and in order to protect the generator, one solution currently implemented is to temporarily disconnect the inverter from the microgrid.

However, the drawback of such a disconnection is not allowing the distribution of electricity coming from the electrical energy source. This then requires restarting of the generator. Furthermore, and in particular in the context of a microgrid, such disconnection may further destabilise the microgrid, creating new instabilities that are potentially detrimental for the other generators that are connected thereto.

One of the aims of the invention is therefore to find a method for controlling a generator, and a simple, reliable and economical generator that improves the resolution of the problems relating to the occurrence of instability.

SUMMARY

The invention improves the situation.

A method is proposed for controlling a generator comprising an inverter and an electrical energy source, the generator being configured to deliver output electrical values to an electrical distribution grid, the generator being controlled by a control law, the control law comprising a set of fixed values of parameters for modelling the functioning of a virtual generator so that the control law is configured to determine at least one target output value that must be delivered by the generator to the electrical distribution grid, the method comprising:

determining at least one target output value by means of the control law;

comparing the target output value with at least one allowable maximum value of the generator;

if the target output value is higher than the allowable maximum value, determining a modified value of at least one parameter of the control law.

Through these provisions, it is possible to improve the performances of the generator compared with a generator controlled by a static control law. In particular, the generator makes it possible to obtain satisfactory electrical output values, in particular in the case of instability on the electrical distribution grid.

The features disclosed in the following paragraphs can optionally be used. They may be used independently of one another or in combination with one another:

According to one embodiment, if the target output value is below or equal to the allowable maximum value, the fixed value of the parameter of the control law is kept.

According to another embodiment, the steps of the method are repeated periodically, the control law comprises, during the following iteration $k+1$ of the method, the determined value of the parameter during the previous iteration $k$.

According to another embodiment, the steps of the method are repeated at a frequency greater than 1 kHz, or even greater than 5 kHz.

According to another embodiment, the generator emulates a synchronous generator that delivers an electrical current the frequency of which is determined by the speed of rotation of a rotor with respect to a stator, the parameters of the control law being chosen from a stator resistance of the stator, a transient inductance of the stator, a permanent inductance of the stator, a permanent inductance of the stator and a transient open-loop time of the synchronous virtual generator.

According to another embodiment, the target output value is determined by means of the control law as a function of at least one electrical output value measured at the terminals of the generator.

According to another embodiment, the modified value of the parameter is determined so as to minimise a difference between the modified value and the fixed value of said parameter.

According to another embodiment, the value of the modified parameter is determined so as to minimise a difference between the modified values of the parameter obtained during two successive iterations k, k+1 of the steps of the method.

According to another embodiment, the output electrical value is chosen from a current value, a voltage value and a frequency value.

According to another embodiment, the method is configured so as to control the output electrical value of the generator when an instability occurs on the electrical distribution grid.

According to another aspect, a computer program is proposed comprising instructions which, when the program is executed by a processor, lead to implementing the method according to the invention.

According to another aspect, a non-transient recording medium is proposed that can be read by a processor on which a program is recorded for implementing the method according to the invention.

According to another aspect, a generator is proposed comprising an inverter and an electrical energy source, the generator being configured to deliver output electrical values to an electrical distribution grid, the generator being controlled by a control law, the control law comprising a set of fixed values of parameters for modelling the functioning of a virtual generator so that the control law is configured to determine at least one target output value that must be delivered by the generator to the electrical distribution grid, the generator comprising a processor configured:

to determine at least one target output value by means of the control law;

to compare the target output value with at least one allowable maximum value of the generator;

if the target output value is higher than the allowable maximum value, to determine a modified value of at least one parameter of the control law.

According to one embodiment, the generator is configured to deliver output electrical values to a microgrid.

According to another embodiment, the electrical energy source is a renewable energy source.

BRIEF DESCRIPTION OF THE DRAWINGS

Other features, details and advantages will emerge from the reading of the following detailed description and the analysis of the accompanying drawings, on which.

DESCRIPTION OF EMBODIMENTS

The drawings and the description below contain, mainly, elements of a certain character. They can therefore not only serve to give a better understanding of the present disclosure, but also contribute to the definition thereof, where necessary.

Generator

Figure 1:
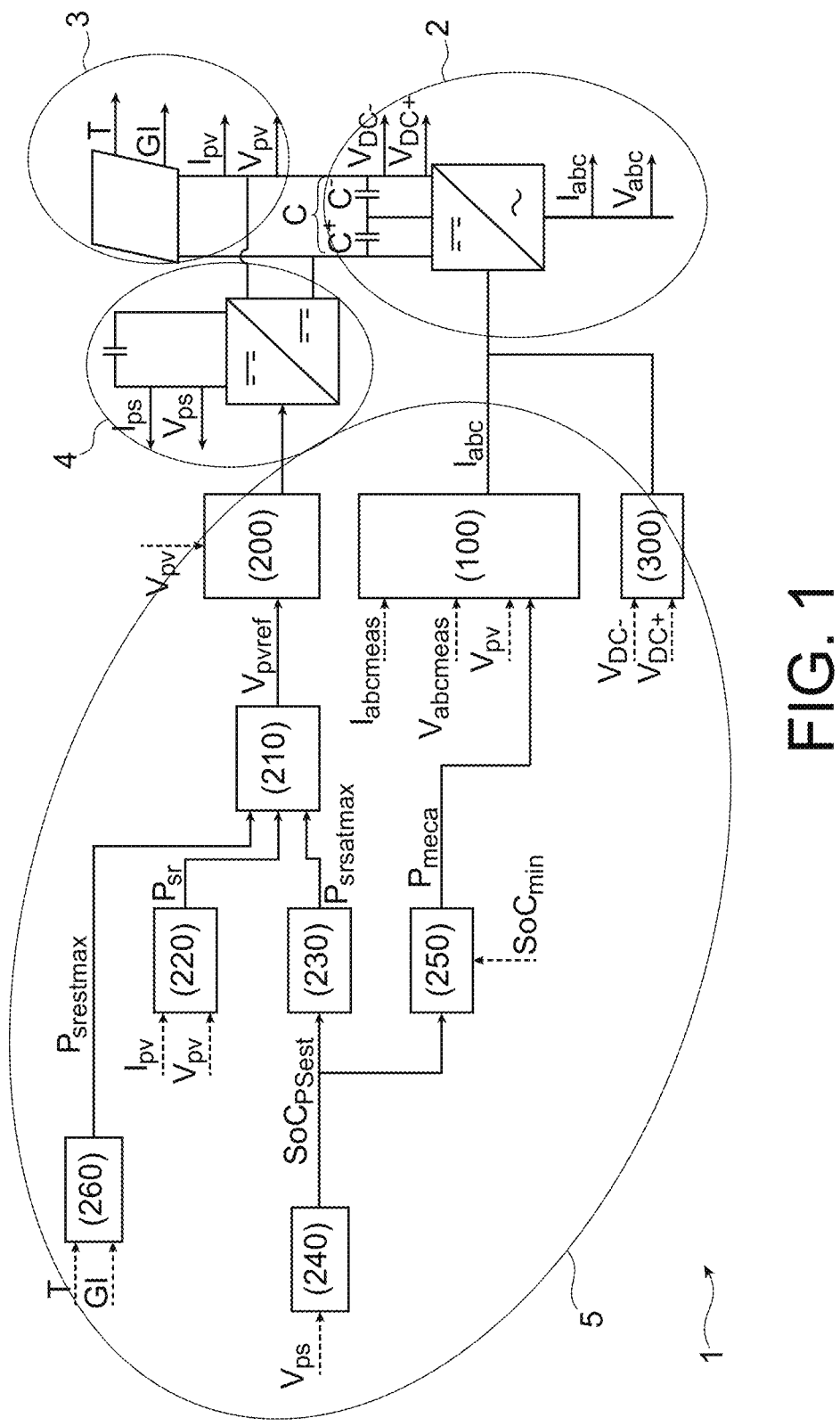
FIG. 1 is a schematic representation of a virtual generator already known from the prior art.

FIG. 1 illustrates schematically a virtual generator, especially a synchronous virtual generator, according to the invention.

"Virtual generator" means a generator behaving as an autonomous device capable of producing electricity.

Such a virtual generator is shown by FIG. 1, also illustrating the document EP 3208907, the content of which is incorporated by reference.

Although described in the context of a particular virtual generator, the invention must however not be limited to this aspect. In particular, any generator intended to deliver, on an electrical distribution grid, a current and a voltage, in particular alternating, can be envisaged.

The electrical distribution grid may be a microgrid or a traditional electricity distribution grid. The generator 1 is then configured for grid forming.

The generator 1 comprises at least one inverter 2 and an electrical energy source 3.

The inverter 2 is configured to be connected to and to deliver to an electrical distribution grid output electrical values $V_S$. The output electrical values $V_S$ are in particular an alternating voltage $V_{abc}$ and an alternating current $I_{abc}$, both having a frequency $f_{abc}$. The output electrical values $V_S$ may also comprise an active power $P_{abc}$ and a reactive power $Q_{abc}$.

The output electrical values $V_S$ are the result of a conversion, by the inverter 2, of input electrical values $V_E$. The input electrical values $V_E$ are in particular a D.C. voltage $V_c$ and a D.C. current $I_c$ produced by the electrical energy source 3.

The inverter 2 is provided with electronic switches which, controlled on the basis of duty cycles, referred to as instantaneous duty cycles $\alpha_{abc}$, make it possible to deliver the output electrical values $V_S$ to the electrical distribution grid.

The electronic switches may for example comprise insulated gate bipolar transistors (IGBTs).

The electrical energy source 3 may be a renewable energy source comprising for example photovoltaic panels, wind turbines, marine turbines or thermodynamic machines. Other types of renewal electrical energy source are also possible.

The renewable energy source 3 may be subjected to unforeseen climatic events, and consequently be an unstable and intermittent energy source.

The generator 1 may also comprise a power and/or energy accumulation system 4, such as a battery or the like.

Control law

In order to adjust and optimise the output electrical values $V_S$ delivered to the electrical distribution grid, the generator 1, in particular the inverter 2, is driven by a control law 5.

The control law 5 is implemented by data processing means such as a computer, a calculator, a processor or a control card.

The control law 5 is configured to afford a match between the electrical power generated by the electrical energy source 3 and the power consumed by the electrical distribution grid.

The control law 5 is also configured to enable the generator 1 to respond to a load demand on the electrical distribution grid and/or to a fluctuation in the electricity production by the electrical energy source 3.

"Load demand" means in particular a variation in the power consumed by a load on the electrical distribution grid. By way of non-limitative example, a load may be industrial equipment (for example a factory and its machines), domestic equipment, street furniture in the electrical distribution grid, electrical recharging terminals, or other.

According to one embodiment, the control law 5 is configured so that the generator 1 thus emulates the behaviour of a synchronous generator.

"Synchronous generator" means a generator that produces an electric current the frequency of which is determined by the speed of rotation of a movable part (rotor) with respect to a fixed part (stator).

To this end, and with reference to FIG. 1 (FIG. 1*a* of the document EP 3208907), the control law 5 may comprise various blocks. In particular, the control law 5 comprises a control block 100.

The control block 100 is configured to determine control values for controlling the inverter 2 so that the output electrical values $V_S$ are equal to, or close to, target output values $V_{S,target}$. Target output values $V_{S,target}$ may therefore be electrical values of the inverter 2.

The inverter 2 can thus deliver output electrical values $V_S$ adapted to the electrical distribution grid.

Method

The control law 5 comprises the solving of the electro-mechanical differential equations for modelling the functioning of the virtual generator as well as the connection thereof to the electrical distribution grid. The use of the control law 5 requires the development of a computer program (or of an algorithm) based on these differential equations.

Purely by way of illustration, a description is given below of the equations for modelling the functioning of a synchronous virtual generator according to a particular modelling known to persons skilled in the art. Naturally the invention is not limited to this model, other models also known per se being able to be used for establishing the control law 5.

Hereinafter the symbols indicated in the following table are used for modelling the synchronous virtual generator:

TABLE 1

| Variable | Definition |
|---|---|
| $\psi_d$ | Stator flux on the axis d of the synchronous virtual generator |
| $\psi_q$ | Stator flux on the axis q of the synchronous virtual generator |
| $\psi_{fd}$ | Rotor flux on the axis d of the synchronous virtual generator |
| $i_d$ | Output current on the axis d of the synchronous virtual generator |
| $i_q$ | Output current on the axis q of the synchronous virtual generator |
| $\omega_{base}$ | Reference rotation speed of the synchronous virtual generator |
| $R_a$ | Stator resistance of the stator of the synchronous virtual generator |
| $L'_d$ | Transient inductance on the axis d of the stator of the synchronous virtual generator |
| $L_d$ | Permanent inductance on the axis d of the stator of the synchronous virtual generator |
| $L_q$ | Permanent inductance on the axis q of the stator of the synchronous virtual generator |
| $T'_{do}$ | Transient time in open loop of the synchronous virtual generator |

The modelling uses the transform dq0 relating to synchronous machines and three-phase inverters. According to this modelling, the fluxes of a synchronous generator can be described on the axes d and q as follows:

$$\dot{\psi}_d = \omega_{base} \cdot \left[ e_d + \omega_r \cdot \psi_q - R_a \cdot \frac{1}{L'_d} \cdot \psi_d + R_a \cdot \left( \frac{1}{L'_d} - \frac{1}{L_d} \right) \cdot \psi_{fd} \right]$$

$$\dot{\psi}_q = \omega_{base} \cdot \left[ e_q - \omega_r \cdot \psi_d - R_a \cdot \frac{1}{L_q} \cdot \psi_q \right]$$

$$\dot{\psi}_{fd} = \omega_{base} \cdot \left[ e_{fd} + \frac{L_d}{T'_{do} \cdot L'_d} \cdot \psi_d - \frac{L_d}{T'_{do} \cdot L'_d} \cdot \psi_{fd} \right]$$

Furthermore, the output current of the synchronous virtual generator can be described on the axes d and q as follows:

$$i_d = -\frac{1}{L'_d} \cdot \psi_d + \left( \frac{1}{L'_d} - \frac{1}{L_d} \right) \cdot \psi_{fd}$$

$$i_q = -\frac{1}{L_q} \cdot \psi_q$$

Figure 2:
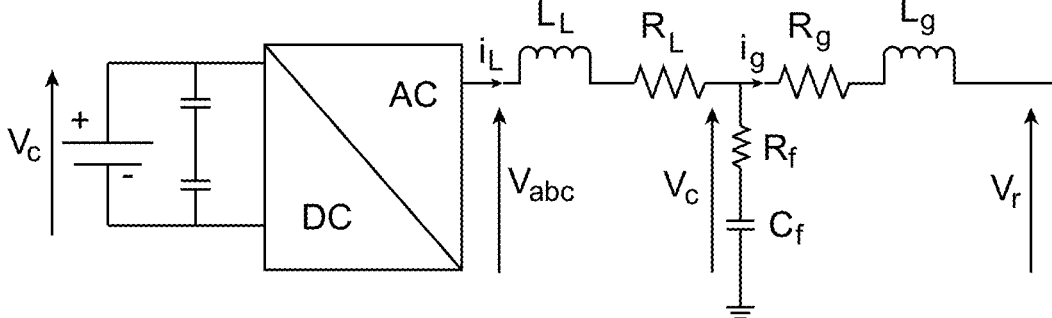
FIG. 2 is a representation of an equivalent electrical diagram of the connection of the inverter to the electrical distribution grid.

The modelling may also use in particular the characteristics of the electrical distribution grid and of the inverter 2. These characteristics of the distribution grid are imposed and non-modifiable. The symbols indicated in the following table are then used in relation to FIG. 2:

TABLE 2

| Variable | Definition |
|---|---|
| $V_c$ | Voltage of the filtered single-wire grid |
| $V_r$ | Voltage of the single-wire grid |
| $L_L$ and $R_L$ | Impedance and resistance of the inverter |
| $L_r$ and $R_r$ | Impedance and resistance of the grid |
| $C_f$ and $R_f$ | Capacitance and resistance of the output filter |

7 8

In this way parameters are obtained for modelling the synchronous virtual generator and the connection thereof to the electrical distribution grid.

As indicated in the above equations, a control law usually comprises fixed values $p_{ref}$ of parameters modelling the virtual generator, corresponding here to $R_\alpha$, $L'_d$, $L_d$, $L_q$, $T'_{do}$. Then static control law is spoken of. The number of parameters of the control law may of course be greater or lesser, since there exist usable modellings of greater or lesser complexity.

"Fixed values of parameters of a static control law" means values determined when the control law is established and invariable subsequently over time, in particular when the generator is functioning.

As known prior art, such a control law 5 thus makes it possible to obtain an equation that can be simplified as follows:

$$V_{S,target}(k+1)=M[p_{ref},V_S(k)]$$

M corresponds to the modelling corresponding in particular to the solving of the differential equations taken into account, $p_{ref}$ corresponds to the fixed values of parameters of the static control law and $V_S$ corresponds to the output electrical values of the inverter 2 at the instant k.

Naturally the control law 5 may also take into account other values, in particular electrical ones, which are not described here for reasons of simplification. By way of example, the control law 5 may also take into account the D.C. voltage values $V_c$ and direct current values $I_c$ of the electrical energy source 3, or any other values.

It is thus possible to determine the target output values $V_{S,target}$ for controlling the inverter at the instant k+1 according to the fixed values $p_{ref}$ of the parameters and the output electrical values $V_S$ measured at the instant k.

Taking into account the output electrical values $V_S$ thus makes it possible to continuously detect the fluctuations occurring on the electrical distribution grid, and to adapt these values in real time according to the target output values $V_{S,target}$ determined by the control law and serving as a setpoint value of the inverter 2.

However, a static control law with such fixed values $p_{ref}$ may prove to be unsatisfactory when it is a case of controlling the generator 1 during certain instabilities, in particular of short duration and/or high amplitude.

"Instability of short duration" means a temporary divergent mode, causing an unstable state different from the acceptable and usual stable state of the generator 1. An instability may in particular have a duration of less than 20 milliseconds, or even less than 10 seconds, or even less than 5 milliseconds.

By way of example, an instability may in particular occur when the generator 1 not producing any produced current passes very quickly to a production of a maximum power. An instability may also occur during a short-circuit causing a drop in the nominal voltage $V_{abc}$ to 0 (or close to 0) in a few seconds.

Thus the control method according to the invention makes it possible to modify the values of the parameters of the control law 5 over time. A dynamic control law is then spoken of, unlike a static control law. The values of the parameters are then no longer necessarily equal to the fixed values $p_{ref}$ of the static control law.

Modifying the values of the parameters of the control law 5 thus makes it possible to determine acceptable electrical output values $V_S$ by dispensing with the limits inherent in the modelling of the functioning of the virtual generator when instabilities appear on the electrical distribution grid.

Figure 3:
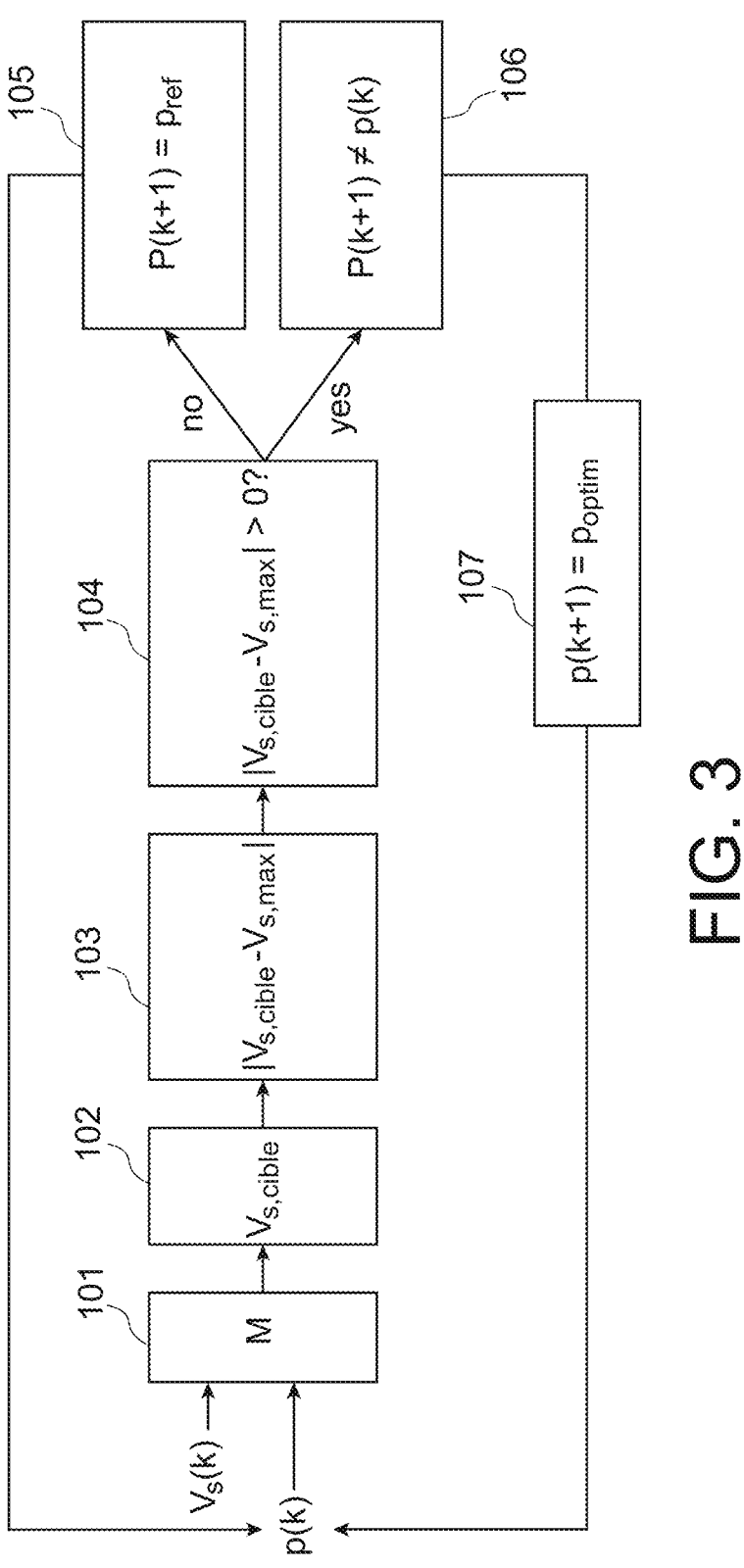
FIG. 3 is a schematic representation of the control method according to the present invention.

The control method according to the invention is more particularly described in relation to FIG. 3.

According to a step 101, the control law 5 is implemented. The control law 5 in particular takes into account measurements of the output electrical values $V_S(k)$ of the generator 1. More particularly, these output electrical values $V_S(k)$ are measured at an instant k at the output terminals of the inverter 2.

According to a step 102, the target output values $V_{S,target}$ (k+1) that the inverter 2 must actually deliver to the electrical distribution grid at an instant k+1 are thus determined from the control law 5.

These target output electrical values $V_{S,target}$ must not cause any overvoltage or overcurrent of the generator 1, liable to otherwise degrade the functioning thereof.

Thus, according to a step 103, it is determined whether the target output values $V_{S,target}$ are not liable to exceed allowable maximum values $V_{S,max}$. More particularly, the allowable maximum values $V_{S,max}$ are maximum use values particular to the generator 1, and particular to the inverter 2, inherent in its design and operating electrical characteristics.

According to one embodiment, the target output values $V_{S,target}$ are thus in step 103 compared with respect to the acceptable maximum values $V_{S,max}$.

According to an embodiment more particularly described hereinafter, the target output values $V_{S,target}$ may comprise the alternating voltage $V_{abc}$ (corresponding to the values $e_d$ and $e_q$ along the axes d and q of the transform dq0), the alternating current $I_{abc}$ (corresponding to the values $i_d$ and $i_q$ along the axes d and q of the transform dq0) and the duty cycle $\alpha_{abc}$ (corresponding to the values $\alpha_d$ and $\alpha_q$ along the axes d and q of the transform dq0).

According to this embodiment, the allowable maximum values $V_{S,max}$ may then comprise in particular the output maximum current value $I_{max}$ allowable by the inverter, the output maximum value of the duty cycle $\alpha_{max}$ allowable by the inverter and/or the output maximum voltage value $e_{max}$ allowable by the inverter.

Cases of exceeding, $V_e$, $V_i$, $V_\alpha$, can be determined, by calculating for example the difference between the absolute values respectively of the target output values $V_{S,target}$ and the maximum values $V_{S,max}$, as follows:

$$V_e(k)=\sqrt{e_d(k)^2+e_q(k)^2}-e_{max}$$

$$V_i(k)=\sqrt{i_d(k)^2+i_q(k)^2}-i_{max}$$

$$V_\alpha(k)=\sqrt{e_\alpha(k)^2+e_\alpha(k)^2}-\alpha_{max}$$

Other methods for calculating cases of exceeding are possible, it being understood that this term designates the mathematical distance between the values compared.

In a step 104, it is determined whether at least one case of exceeding, $V_e$, $V_i$, $V_\alpha$, between the target output values $V_{S,target}$ and the allowable maximum values $V_{S,max}$ is greater than or less than 0.

If all the cases of exceeding calculated are less than or even equal to 0, this means that no electrical output value $V_S$ is liable to exceed the allowable maximum values $V_{S,max}$.

In a step 105, the fixed values $p_{ref}$ of the parameters are therefore assigned to the parameters p(k+1) at the instant k+1. This is because a static control law is sufficient to ensure satisfactory behaviour of the generator 1, complying with its electrical operating limits.

Conversely, if at least one case of exceeding is higher than 0, this means that at least one electrical output value $V_S$ is liable not to remain within the limits of the allowable maximum values $V_{S,max}$.

If such target output values $V_{S,target}$ were actually used to control the inverter 2 (as is the case according to a static control law), the generator 1 would risk being in a situation of overcurrent or overvoltage, causing a degradation of the functioning thereof. A static control law is insufficient to ensure a satisfactory behaviour of the generator 1, complying with its electrical operating limits.

It is therefore necessary to optimise the values of the parameters p(k+1) at the instant k+1 (step 106).

Thus, according to a step 107, the values of the parameters of the control law 5 are modified. Modified values $p_{optim}$ of the parameters of the control law 5 are then determined.

The modified values $p_{optim}$ are advantageously determined firstly by minimising the variation in the modified values $p_{optim}$ with respect to the fixed values $p_{ref}$ of the static control law, and secondly by limiting any exceeding of the allowable maximum values $V_{S,max}$.

According to one embodiment, the modified values $p_{optim}$ may for example be determined by quadratic solution.

According to this embodiment, it is sought to minimise a cost function, for example such that:

$$\left\| \frac{p_{ref} - p_{optim}^{k+1}}{p_{ref}} \right\|^2 + \mu \cdot \begin{bmatrix} \varepsilon_E \\ \varepsilon_i \\ \varepsilon_\alpha \end{bmatrix} + \beta \cdot \left\| \frac{p_{optim}^{k+1} - p_{optim}^{k}}{p_{ref}} \right\|^2$$

Furthermore, the condition aimed at limiting any exceeding of the allowable maximum values $V_{S,max}$ can be written as follows:

$$\begin{bmatrix} V_e(k+1, p_{optim}) \\ V_i(k+1, p_{optim}) \\ V_\alpha(k+1, p_{optim}) \end{bmatrix} - \begin{bmatrix} \varepsilon_e \\ \varepsilon_i \\ \varepsilon_\alpha \end{bmatrix} = \mathbb{O}_{3,1}$$

$\mu$ and $\beta$ are fixed values. $\mu$ makes it possible to take into account an acceptable error $\varepsilon$ for each output value, in order to ensure that the minimisation converges towards a possible solution. $\beta$ aims to ensure that the modified values $p_{optim}^{k+1}$ at the instant k+1 remain close to the modified values $p_{optim}^{k}$ obtained at the previous instant k.

$\varepsilon_E$, $\varepsilon_i$, $\varepsilon_\alpha$ correspond to the acceptable errors for the cases of exceeding, $V_e$, $V_i$, $V_\alpha$, according to the embodiment particularly described. These errors $\varepsilon_E$, $\varepsilon_i$, $\varepsilon_\alpha$ are advantageously small, or even equal to 0.

Once the modified values $p_{optim}$ have been obtained, the control law 5 can comprise these modified values $p_{optim}$ and can make it possible to determine output target values $V_{S,target}$ affording suitable control of the generator 1.

The steps of the control method may be repeated, in particular periodically. More particularly, the steps of the method are repeated at regular time intervals, for example at a frequency greater than 1 kHz, or even 5 kHz, or even around 6.66 kHz.

In a variant, the control method takes into account a time window at each iteration, the time window then being offset by sliding during each successive iteration.

Experimental Results

Figure 4:
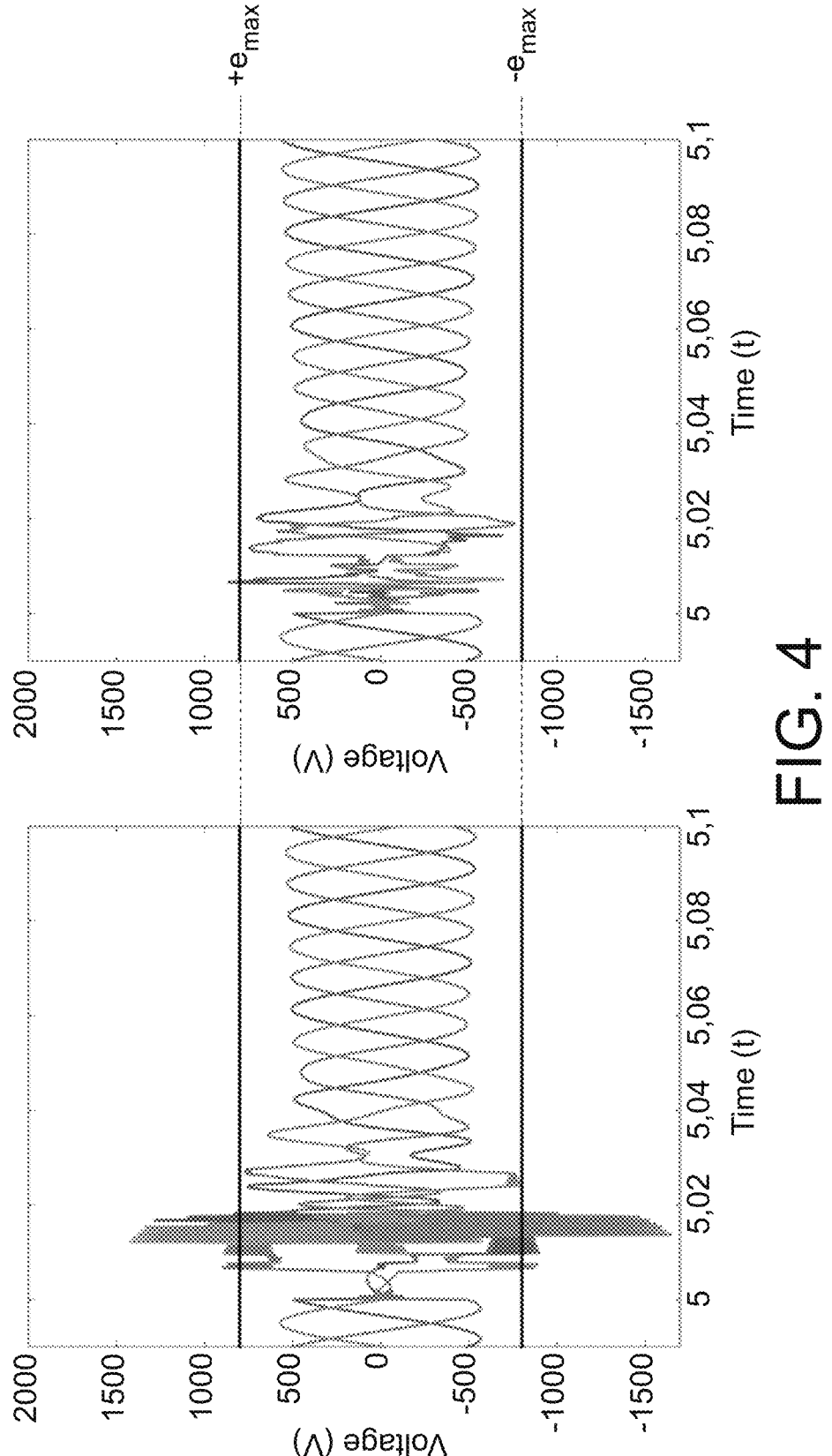
FIG. 4 is a representation of the voltage values of a three-phase virtual generator known from the prior art following a short-circuit on the electrical distribution grid (on the left) and voltage values of a three-phase virtual generator according to the invention following the same short-circuit on the electrical distribution grid (on the right).
Figure 5:
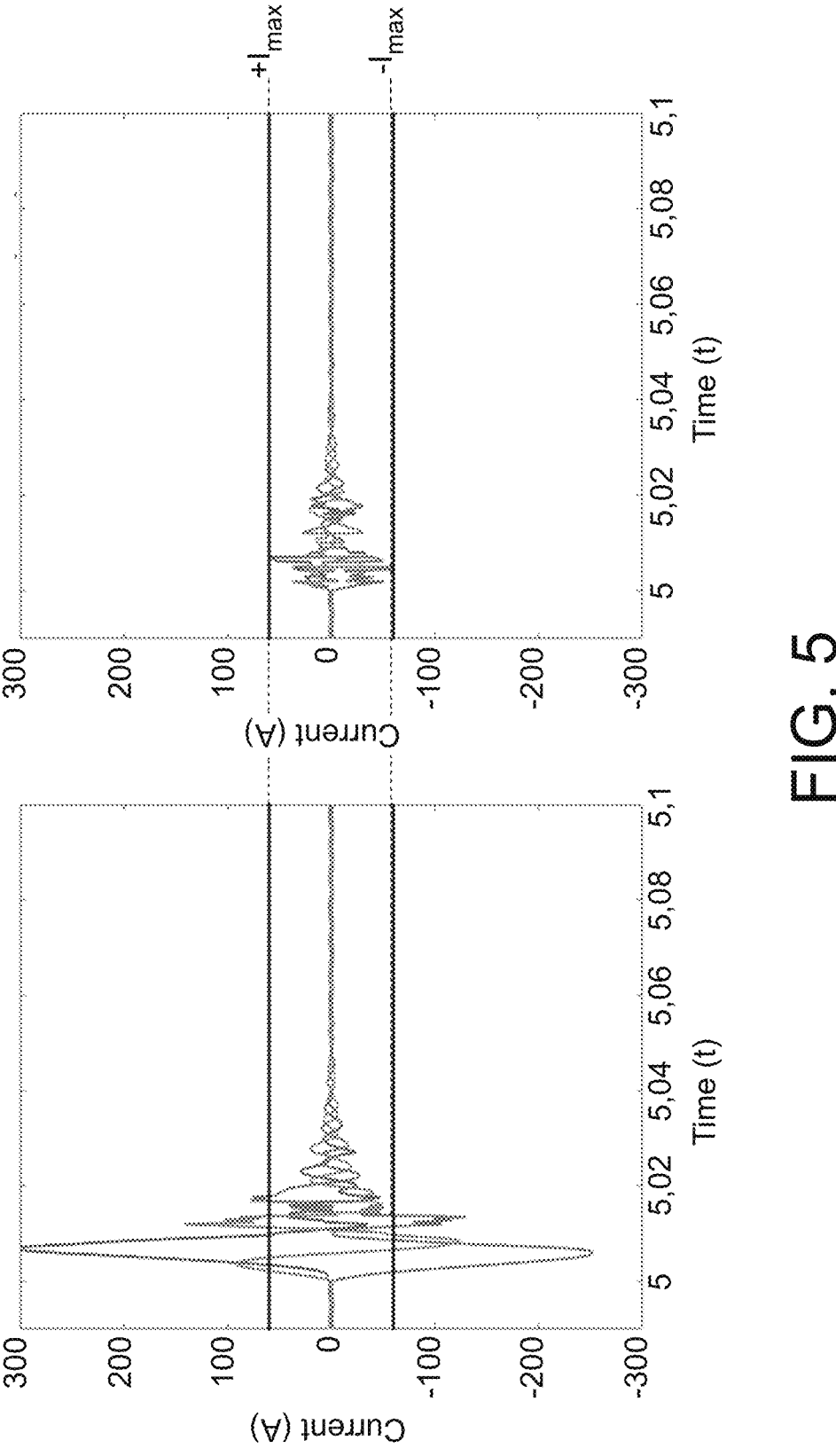
FIG. 5 is a representation of the current values of a three-phase virtual generator known from the prior art following a short-circuit on the electrical distribution grid (on the left) and current values of a three-phase virtual generator according to the invention following the same short-circuit on the electrical distribution grid (on the right).

FIG. 4 and FIG. 5 present results obtained with the method according to the invention (on the right) compared with a virtual generator using solely a control law statically (on the left) following a short-circuit on the electrical distribution grid.

It is clear that the method according to the invention makes it possible to prevent overvoltages or overcurrents occurring, exceeding the allowable maximum values of the generator.

Obviously, the invention is not limited to the embodiments described above and provided solely by way of example. It encompasses various modifications, alternative forms or other variants that a person skilled in the art will be able to envisage in the context of the present invention and in particular all combinations of the various operating modes described above, able to be taken separately or in association.

The invention claimed is:

1. A method for controlling a virtual generator comprising an inverter and an electrical energy source, the virtual generator being configured to deliver output electrical values to an electrical distribution grid, the virtual generator being controlled according to a control law, the control law comprising a set of values of parameters for modelling functioning of the virtual generator, the set of values of parameters being predetermined before operation of the virtual generator, the control law being applied to one or several values, so that the control law is configured to determine at least one target output value that must be delivered by the virtual generator to the electrical distribution grid, the method comprising:

(i) determining at least one target output value according to the control law, the parameters of the control law being chosen from a stator resistance of the stator, a transient inductance of the stator, a permanent inductance of the stator and a transient open-loop time of the virtual generator;

(ii) comparing the target output value with at least one allowable maximum value of the virtual generator;

(iii) if the target output value is higher than the allowable maximum value, determining a modified value of at least one parameter from the parameters of the control law, wherein the virtual generator emulates a synchronous virtual generator that delivers an electric current a frequency of which is determined by a speed of rotation of a rotor with respect to a stator; and (iv) if the target output value is less than or equal to the allowable maximum value, keeping the value of the parameter of the control law, and wherein the control law is a dynamic control law.

2. The method according to claim 1, wherein the operations of (i), (ii) and (iii) of the method are repeatedly implemented periodically, the control law for a following implementation of the operations of (i), (ii) and (iii) of the method having the value of the at least one parameter determined during a previous implementation of the operations of (i), (ii) and (iii) of the method.

3. The method according to claim 2, wherein the operations of (i), (ii) and (iii) of the method are repeatedly implemented at a frequency greater than 1 kHz.

4. The method according to claim 1, wherein the target output value is determined by means of the control law according to at least one output electrical value measured at terminals of the virtual generator.

5. The method according to claim 1, wherein the modified value of the parameter is determined so as to minimise a difference between the modified value and the predetermined value of said parameter.

6. The method according to claim 1, wherein the steps of the method are repeated, the value of the modified parameter is determined so as to minimise a difference between the modified values of the parameter obtained during two successive iterations of the steps of the method.

7. The method according to claim 1, wherein the output electrical value is chosen from a current value, a voltage value and a frequency value.

8. The method according to claim 1, configured to control the output electrical value of the virtual generator when an instability occurs on the electrical distribution grid.

9. A non-transitory recording medium that can be read by a processor, on which a program is recorded for implementing the method according to claim 1.

10. A virtual generator comprising an inverter and an electrical energy source, the virtual generator being configured to deliver output electrical values to an electrical distribution grid, the virtual generator being controlled according to a control law, the control law comprising a set of values of parameters for modelling functioning of the virtual generator, the set of values of parameters being predetermined before operation of the virtual generator, the control law being applied to one or several values, so that the control law is configured to determine at least one target output value that must be delivered by the virtual generator to the electrical distribution grid, the virtual generator comprising a processor configured:

(i) to determine at least one target output value according to the control law, the parameters of the control law being chosen from a stator resistance of the stator, a transient inductance of the stator, a permanent inductance of the stator and a transient open-loop time of the virtual generator;

(ii) to compare the target output value with at least one allowable maximum value of the virtual generator; and (iii) if the target output value is higher than the allowable maximum value, to determine a modified value of at least one parameter from the parameters of the control law, wherein the virtual generator emulates a synchronous virtual generator that delivers an electric current a frequency of which is determined by a speed of rotation of a rotor with respect to a stator, wherein the control law is a dynamic control law, and wherein the operations of (i), (ii) and (iii) are repeatedly implemented periodically, the control law for a following implementation of the operations of (i), (ii) and (iii) having the value of the at least one parameter determined during a previous implementation of the operations of (i), (ii) and (iii).

11. The virtual generator according to claim 10, configured to deliver output electrical values to a microgrid.

12. The virtual generator according to claim 10, wherein the electrical energy source is a renewable energy source.

13. The method according to claim 1, wherein if the target output value is higher than the allowable maximum value, modified values if the parameters of the control law are determined.

14. The method according to claim 13, wherein the parameters of the control law include at least two parameters chosen from the stator resistance of the stator, the transient inductance of the stator, the permanent inductance of the stator and the transient open-loop time of the synchronous virtual generator.

15. The method according to claim 1, wherein the at least one parameter from the parameters of the control law comprises the transient inductance of the stator or the transient open-loop time of the synchronous virtual generator.

16. The virtual generator according to claim 10, wherein the at least one parameter from the parameters of the control law comprises the transient inductance of the stator or the transient open-loop time of the synchronous virtual generator.

17. A method for controlling a virtual generator comprising an inverter and an electrical energy source, the virtual generator being configured to deliver output electrical values to an electrical distribution grid, the virtual generator being controlled according to a control law, the control law comprising a set of values of parameters for modelling functioning of the virtual generator, the set of values of parameters being predetermined before operation of the virtual generator, the control law being applied to one or several values, so that the control law is configured to determine at least one target output value that must be delivered by the virtual generator to the electrical distribution grid, the method comprising:

(i) determining at least one target output value according to the control law, the parameters of the control law being chosen from a stator resistance of the stator, a transient inductance of the stator, a permanent inductance of the stator and a transient open-loop time of the virtual generator;

(ii) comparing the target output value with at least one allowable maximum value of the virtual generator; and (iii) if the target output value is higher than the allowable maximum value, determining a modified value of at least one parameter from the parameters of the control law, wherein the virtual generator emulates a virtual generator that delivers an electric current a frequency of which is determined by a speed of rotation of a rotor with respect to a stator, wherein the control law is a dynamic control law, and wherein the steps of the method are repeated, the value of the modified parameter is determined so as to minimise a difference between the modified values of the parameter obtained during two successive iterations of the steps of the method.

18. The method according to claim 17, wherein the target output value is determined by means of the control law according to at least one output electrical value measured at terminals of the virtual generator.

19. The method according to claim 17, wherein the modified value of the parameter is determined so as to minimise a difference between the modified value and the predetermined value of said parameter.

20. The method according to claim 17, wherein the output electrical value is chosen from a current value, a voltage value and a frequency value.

* * * * *